No. 785,707. PATENTED MAR. 28, 1905.
F. A. BROWNELL.
PHOTOGRAPHIC PLATE HOLDER.
APPLICATION FILED DEC. 22, 1902.
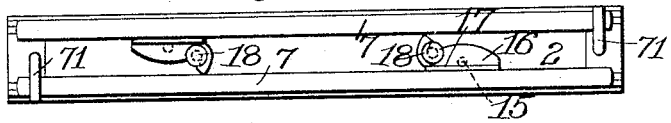
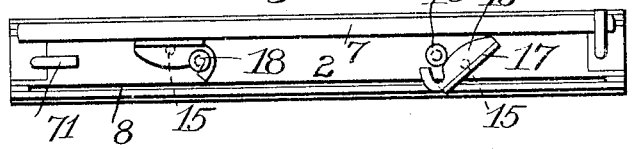
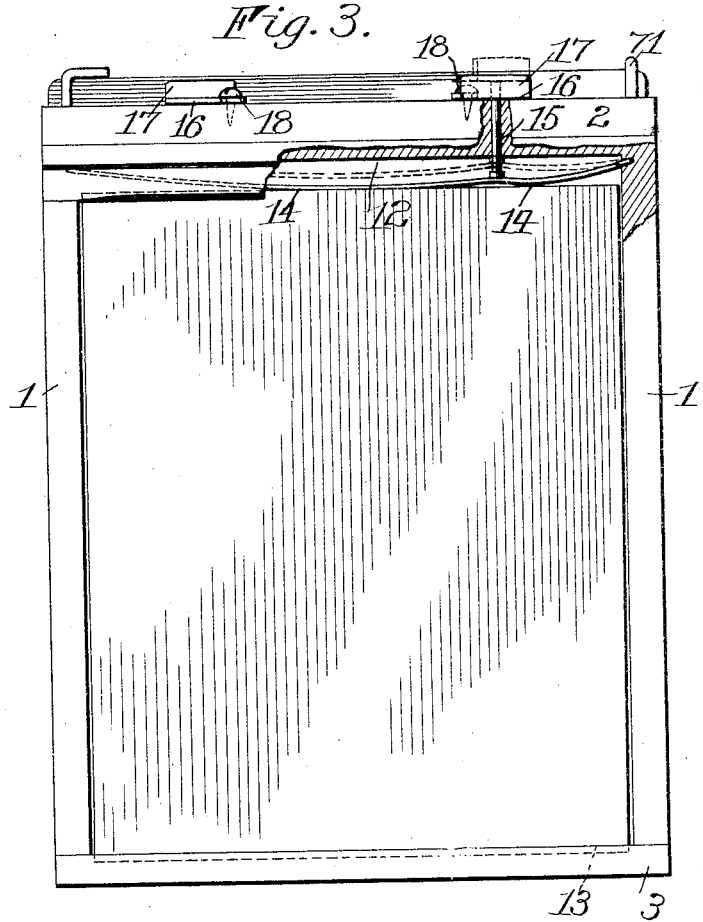
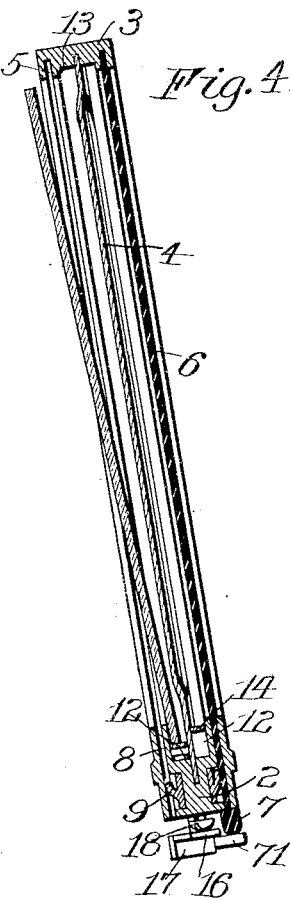
Witnesses. Inventor.

No. 785,707.                                         Patented March 28, 1905.

UNITED STATES PATENT OFFICE.

FRANK A. BROWNELL, OF ROCHESTER, NEW YORK, ASSIGNOR, BY MESNE ASSIGNMENTS, TO EASTMAN KODAK COMPANY, OF ROCHESTER, NEW YORK, A CORPORATION OF NEW YORK.

PHOTOGRAPHIC-PLATE HOLDER.

SPECIFICATION forming part of Letters Patent No. 785,707, dated March 28, 1905.

Application filed December 22, 1902. Serial No. 136,140.

*To all whom it may concern:*

Be it known that I, FRANK A. BROWNELL, of Rochester, in the county of Monroe and State of New York, have invented certain new and useful Improvements in Photographic-Plate Holders; and I do hereby declare the following to be a full, clear, and exact description of the same, reference being had to the accompanying drawings, forming a part of this specification, and to the reference-numerals marked thereon.

My present invention relates to photographic-plate holders, and particularly to the means employed for retaining and releasing the plates, whereby they may be secured from accidental removal when in position therein and may be readily removed when desired, and this without essential modification of the existing type of plate-holder.

To these and other ends the invention consists in certain improvements and combinations of parts, all as will be hereinafter more fully described, the novel features being pointed out in the claims at the end of the specification.

In the drawings, Figure 1 is an end view of a double plate-holder provided with my improvements, the slides being in position and the plates locked from movement. Fig. 2 is a similar view with one slide removed, showing the plate-securing device operated to permit the removal of the plate. Fig. 3 is a front elevation of a plate-holder with the parts in position shown in Fig. 2, a portion of the frame or casing being cut away. Fig. 4 is a longitudinal sectional view of a double plate-holder, showing the manner of removing the plate.

Similar reference-numerals in the several figures indicate similar parts.

The main frame of the plate-holder is not essentially different from ordinary double plate-holders in use, embodying the sides 1, the top rail or end piece 2, the bottom rail or end piece 3, and the central septum or partition 4. The side rails 1 and the end piece 3 are provided with the usual grooves or ways 5 for the accommodation of the slides or covers 6, the latter having at their upper end the enlargements 7 and adapted to be locked by the turn-buttons 71, said slides passing through passages 8 in the end piece 2, which latter are also provided with light-excluding flaps 9, (see Fig. 4,) these parts being of the usual or any preferred construction. The photographic plates are arranged to lie in the holder on opposite sides of the septum 4 and with their ends arranged in the grooves formed by overhanging ledges or flanges 13 in the end piece 3 and the grooves formed by overhanging ledges or flanges 12 on the end piece 2, the latter flanges being the longer, so that in inserting the plate one end is placed beneath the ledge or flange 12, the other end moved toward the septum, and then the plate is forced longitudinally toward the end piece 3, so that the flange or overhanging ledge 13 will prevent it from outward movement, the longitudinal movement of the plate beneath the ledge 13 being caused by a movable member in the form of a spring 14, arranged in the groove beneath the ledge 12, which serves to keep the plate firmly in position. The ends of the spring 14 are bent down and engage in recesses near the ends of the side pieces of the frame, the tendency of the spring being to move outward or away from the plate when released.

15 indicates a pin resting upon the spring and passing upwardly through the end piece 2 and to the exterior of the holder, its upper end being provided with a catch-plate 16, having a slot near one end, and operating-lugs 17. The pin 15 is permitted a slight rotation on its longitudinal axis, and upon the end piece 2 near the plate 16 is arranged a headed-pin or screw 18, provided with an overhanging edge, beneath which the slotted end of the plate engages when the pin is moved inward against the tension of the spring and turned to the position shown in Fig. 1 and to the left in Fig. 2. When, however, the plate 16 is turned to the position shown at the right in Fig. 2, it will be released from the catch 18 and the spring will then move to the position shown in dotted lines in Fig. 3—out of contact with the end of the plate—which may then be removed from the holder (assuming, of course, that the front slide is out of position) by inverting the latter, as shown in Fig. 4, and allowing the plate to drop out. The plate 16 is arranged in such relation to the slot through which the slide operates that it cannot be turned and disengaged from the catch-pin 18 until the slide is removed, as shown in Figs. 1 and 2, so that there is no opportunity for accidental removal of the plate or of its becoming loose in the casing until the slide is removed and then only in case the plate-holder is reversed, as shown in Fig. 4. The spring is so constructed and arranged that it holds the plate with a yielding pressure even when the catch-plate 16 is engaged to allow for slight differences in the length of plates, as will be understood. In the present embodiment of the invention it is shown applied to a double plate-holder, the controlling and securing device for each plate being arranged to be controlled by the slide on the side of the holder where it is located.

The device above described is very simple and cheap in construction and may be readily applied to plate-holders of the type at present in use without altering the construction of the holder and simply by the addition of parts, which may be readily applied by an unskilled operator.

I claim as my invention—

1. The combination with a plate-holder having an exposing-slide and plate-retaining devices, of means for controlling the operation of the plate-retaining devices operable from the exterior of the holder and held from operation by the slide to prevent the disengagement of the plate when the slide is in position in the holder.

2. The combination with a plate-holder having the plate-retaining ledge and an exposing-slide, of a movable member for retaining the plate beneath the ledge having a controlling portion at the exterior of the holder and adapted to be held from operation by the exposing-slide to prevent the release of the plate while the slide is in the holder.

3. In a plate-holder, the combination with the frame having the ledges at the end for retaining a photographic plate and an exposing slide or cover, of a movable member for retaining the plate beneath one of the ledges operable from the exterior of the holder coöperating with and controlled by the exposing-slide.

4. The combination with a plate-holder having the exposing-slide, the plate-retaining ledge at one end and the movable member, of a controlling part for the member coöperating with the slide to prevent the movement of said member when the slide is in the holder.

5. The combination with a plate-holder having the exposing-slide, the plate-retaining ledge and the automatically-movable plate-engaging member, of means for holding the member in engagement with the plate and adapted to be held from operation by the slide when the latter is in the holder to prevent the release of the plate.

6. The combination with a plate-holder having the exposing-slide, the plate-retaining ledge and the automatically-movable plate member opposite the ledge, of the catch for holding the member in engagement with the plate, operable from the exterior of the holder and prevented from operation by the slide when the latter is in the holder.

7. The combination with a plate-holder having the plate-retaining ledge and the plate-engaging spring, of the catch-plate connected to the spring and the catch projection with which it is adapted to engage.

8. The combination with a plate-holder having the ledge and the plate-engaging spring, of the pin connected to the spring and extending outside the holder, the movable plate thereon and the catch projection with which the plate engages.

9. The combination with a plate-holder having the exposing-slide, the plate-engaging ledge and the plate-engaging spring, of the pin connected to the spring and extending outside of the holder, the movable plate on the spring, and the catch projection with which the plate engages said plate being adapted to engage the exposing-slide when the latter is in the holder.

10. The combination with a plate-holder having the overhanging ledges, the plate-engaging spring pressing normally away from the plate, of means operable from the exterior of the holder for moving the spring toward the plate and holding it in adjusted position.

11. The combination with a plate-holder having the overhanging ledges with which the plate engages, of the plate-engaging spring operating beneath one of the ledges and normally bowed away from the plate, means for flexing the spring into engagement with the plate and means for securing it.

12. The combination with a plate-holder having the overhanging ledge at one end with which the plate engages and a spring operating when free to move away from the ledge, of means for operating the spring toward the ledge to hold the plate yieldingly beneath the former.

13. The combination with a plate-holder having an overhanging ledge at one end with which the plate engages and a spring operating when free to move away from the ledge, of the pin engaging the spring, the catch-plate thereon and the catch projection with which the plate engages.

14. The combination with a plate-holder having an overhanging ledge at one end with which the plate engages, of a spring-operated member operating when free to move away from the ledge, and means for holding said member in yielding engagement with the plate operable from the exterior of the holder.

15. The combination with a plate-holder having the opposing slide and an overhanging ledge at one end with which the plate engages, of a spring-operated member operating when free to move away from the ledge, means for holding the member in yielding engagement with the plate operable from the exterior of the holder and controlled by the slide when in position in the holder.

16. A plate-holder having a normally retracted spring and means for expanding the spring to cause it to advance and secure the sensitized plate.

17. A plate-holder having a normally receding spring upon which one edge of the sensitized plate rests, and means for advancing the spring to cause it to advance and secure the plate in the holder, said spring automatically receding to release the plate when the advancing means are withdrawn.

18. A plate-holder having a normally withdrawn spring forming a seat for one edge of the sensitized plate said spring capable of expansion to advance the plate relative to the holder and secure it therein.

19. A plate-holder having a normally withdrawn spring forming a seat for one edge of the sensitized plate, and means for moving the spring relative to the holder to cause it to advance the plate and secure it within said holder.

20. A plate-holder having a normally depressed member forming a support for one edge of the sensitized plate and pressure means for expanding the support to cause it to advance the plate in the holder, said member automatically resuming a normal position when the pressure thereon is removed.

21. A plate-holder having a centrally-bowed spring forming a support for one edge of the sensitized plate, and means for expanding the spring to cause it to advance and secure the sensitized plate.

22. A plate-holder having a spring extending across it from side to side and with its ends secured in said sides, said spring forming a support for one edge of the sensitized plate, and means for expanding the central portion of the spring to cause the plate to be advanced and secured in the holder, said plate being released by the retraction of said spring.

23. A plate-holder having a reversely-bowed spring forming a support for one edge of the sensitized plate and having its ends fixed in opposite sides of the holder, and means for expanding the spring to cause it to advance and secure the plate in the holder, said plate being released by the retraction of the spring.

FRANK A. BROWNELL.

Witnesses:
G. WILLARD RICH,
ELIZABETH J. PERRY.